United States Patent [19]

Kaji

[11] Patent Number: 4,702,150
[45] Date of Patent: Oct. 27, 1987

[54] SPRING-RETURN TYPE ACTUATOR

[75] Inventor: Shoichi Kaji, Yamanashi, Japan

[73] Assignee: Kitz Corporation, Tokyo, Japan

[21] Appl. No.: 802,224

[22] Filed: Nov. 26, 1985

[30] Foreign Application Priority Data

Jun. 21, 1985 [JP] Japan .............................. 60-92969[U]
Jun. 21, 1985 [JP] Japan .............................. 60-92970[U]

[51] Int. Cl.$^4$ ...................... F01B 29/00; F01B 31/00; F01B 9/00
[52] U.S. Cl. .................................. 92/128; 92/130 C; 92/138
[58] Field of Search ................. 92/128, 130 A, 130 C, 92/138; 267/177; 220/8; 254/10.5; 29/227

[56] References Cited

U.S. PATENT DOCUMENTS

| | | | |
|---|---|---|---|
| 1,952,627 | 3/1934 | Karper .................. | 220/8 X |
| 2,885,769 | 5/1959 | Brown .................. | 254/10.5 |
| 3,175,473 | 3/1965 | Boteler et al. .......... | 254/10.5 X |
| 3,727,523 | 4/1973 | Gulick .................. | 92/130 C |
| 4,319,517 | 3/1982 | McCaleb ................ | 92/128 |
| 4,325,218 | 4/1982 | Weiler et al. ........... | 92/128 X |
| 4,469,016 | 9/1984 | Butler et al. ........... | 92/130 C X |

FOREIGN PATENT DOCUMENTS 2056565 3/1981 United Kingdom .............. 92/130 C

Primary Examiner—Abraham Hershkovitz
Assistant Examiner—Mark A. Williamson
Attorney, Agent, or Firm—Wenderoth, Lind & Ponack

[57] ABSTRACT

A spring-return type actuator for valves including a piston cylinder mechanism, a movement conversion-transmission means disposed in the piston cylinder mechanism for converting reciprocation of a piston into a rotary motion of a valve drive shaft, a spring mechanism disposed in series relative to the piston cylinder mechanism, and a plurality of tie rods each including a male member having one end thereof attached to a flange portion of one side wall of the spring mechanism and having an external thread portion, and a female member having one end thereof screwed into a flange portion of the other side wall of the spring mechanism and having an internal thread portion helically meshed with the external thread portion of the male member and having a winglike member attached to the outer periphery thereof for engaging the female member with the outer periphery of the spring box to prevent the female member from rotating, and each tie rod having a length set larger than the free length of a spring when assumed immediately before the leading end of the external thread portion is released from its state kept in mesh with the internal thread portion so as to prevent the one side wall of the spring mechanism from springing out and the spring from bursting out of the spring mechanism.

1 Claim, 9 Drawing Figures

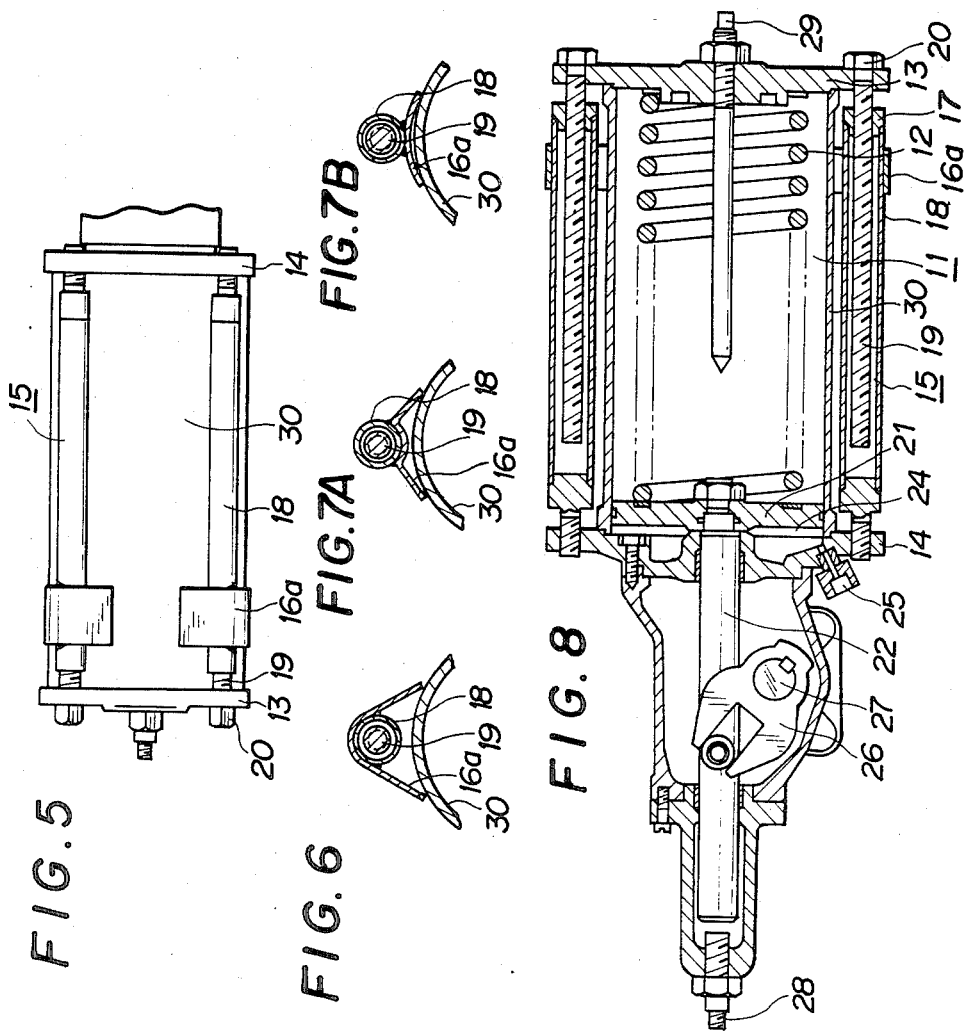

SPRING-RETURN TYPE ACTUATOR

BACKGROUND OF THE INVENTION

1. Field of the Invention

The present invention relates to a spring-return type actuator for valves, particularly for a ball valve, butterfly valve, etc. which is opened or closed by its partial rotation, and specifically relates to a spring-return type actuator comprising a piston cylinder mechanism and a spring mechanism which are disposed in series and fulfilling its function by the reciprocation of a piston which is moved in one direction by the pressure of a fluid such as air, oil, etc. introduced into the piston cylinder mechanism and in the other direction by the resilient force of a spring accommodated within the spring mechanism.

2. Description of the Prior Art

Actuators of the aforementioned type have heretofore been proposed such as, for example, in U.S. Pat. Nos. 4,337,691 and No. 4,355,566. FIG. 1 is a lateral cross section illustrating a prior art spring-return type actuator, FIG. 2 a partially sectioned front view thereof, and FIG. 3 a partially cutaway front view thereof. A spring means 1 has a spring 2 accommodated therewithin. The spring 2 which has been extended to the fullest extent within the spring means 1 as illustrated in FIG. 1 is still kept compressed as accumulating large resilient force. For this reason, when nuts 6 which have fastened rods 5 connecting the opposite side walls 3 and 4 of the spring means 1 as shown in FIG. 2 are loosened and removed for the purpose of disassembling the spring means 1, the side wall 3 is suddenly sprung open by the large resilient force of the spring 2 and the spring 2 simultaneously bursts out of the spring means 1, thereby giving rise to a possibility of injuring the workers and damaging the surrounding articles.

In order to avoid this, at least two long threaded rods 7 have been used in disassembling/assembling the spring means 1. With reference to FIG. 3, though showing a single long threaded rod 7, the spring means 1 is disassembled by loosening and removing a pair of diagonal nuts 6, replacing the corresponding connecting rods 5 with the long threaded rods 7, and loosening and removing the remaining nuts 6. In assembling the spring means 1, at least two long threaded rods 7 are set in position, then the nuts 6 are driven about the long threaded rods 7 to gradually compress the spring 2, and subsequently the long threaded rods 7 are replaced with the connecting rods 5. Since the threaded rod 7 is long, it is difficult to handle. Further, if the thread portion of the long threaded rod 7 should be damaged, the disassembling/assembling work will be difficult to conduct. Furthermore, since the actuator in use undergoes vibration every one stroke of the piston, the repeated vibration may possibly cause the nuts 6 to be loosened and finally removed, with the result that the side wall 3 is spring out and the spring 2 is burst out of the spring means 1 resulting in injury to the workers and damage to the surrounding articles.

What is worse, it is possible that workers may be unaware of or forget the necessity of using the long threaded rods 7 and thus they may loosen the nuts because the spring means 1 has a construction such that it can be disassembled without using the long threaded rods 7. It will be very difficult to keep all workers aware of the necessity of using the long threaded rods 7, make them pay attention to this necessity at all times, and always place the long threaded rods 7 in the vicinity of the actuators.

In view of the difficulty mentioned above, it has heretofore been tried that at least two long threaded rods 7 are mounted in advance on the side wall 3 as projecting from the side wall 3. In this case, however, the projecting long threaded rods 7 require the actuator to occupy a large space, hinder the workers from handling the actuator, and sometimes injure the workers at their thread portions.

Thus, the conventionally used long threaded rods are insufficient as a means for preventing the accidental danger from occurring, and the prior art spring-return type actuators entail the drawbacks as described above.

OBJECT AND SUMMARY OF THE INVENTION

The present invention has been accomplished in view of the drawbacks encountered by the prior art spring-return type actuators.

One object of the present invention is to provide a spring-return type actuator adapted to be used with high safety without using any special separate means for disassembling a spring means.

Another object of the present invention is to provide a spring-return type actuator simple in construction and easy to handle.

To attain the objects described above, according to the present invention, there is provided a spring-return type actuator which comprises a piston cylinder mechanism, a movement conversion-transmission means disposed in the piston cylinder mechanism for converting reciprocation of a piston into a rotary motion of a valve drive shaft, a spring mechanism disposed in series relative to the piston cylinder mechanism, a plurality of tie rods each comprising a male member having on one end thereof attached to a flange portion of one side wall of the spring mechanism and having an external thread portion, and a female member having one end thereof screwed into a flange portion of the other side wall of the spring mechanism and having an internal thread portion helically meshed with the external thread portion of the male member, and each having a length set larger than the free length of a spring when assumed immediately before the leading end of the external thread portion is released from its state kept in mesh with the internal thread portion so as to prevent the one side wall of the spring mechanism from springing out and the spring from bursting out of a spring box, and a plurality of winglike members each attached to the outer periphery of the female member at a position in the vicinity of the leading end of the female member and each provided with a pair of wing arms for engaging the female member with the outer periphery of the spring box to prevent the female member from any rotation in conjunction with rotation of the male member for screwing the male member into or releasing the male member from said female member.

The above and other objects, characteristic features and advantages of the present invention will be explained in the following description of preferred embodiments of the invention, as illustrated in the accompanying drawings.

BRIEF DESCRIPTION OF THE DRAWINGS

FIG. 5 is a front view showing a part of the embodiment of FIG. 4.

FIG. 6 is a cross section taken along line VI—VI in FIG. 4 and illustrating a winglike member.

FIGS. 7(A) and 7(B) are cross sections illustrating other examples of the winglike member of FIG. 6.

FIG. 8 is a lateral cross section illustrating another embodiment of the spring-return type actuator according to the present invention.

DETAILED DESCRIPTION OF THE PREFERRED EMBODIMENTS

The present invention will now be described in detail with reference to the illustrated embodiments.

Figure 1:
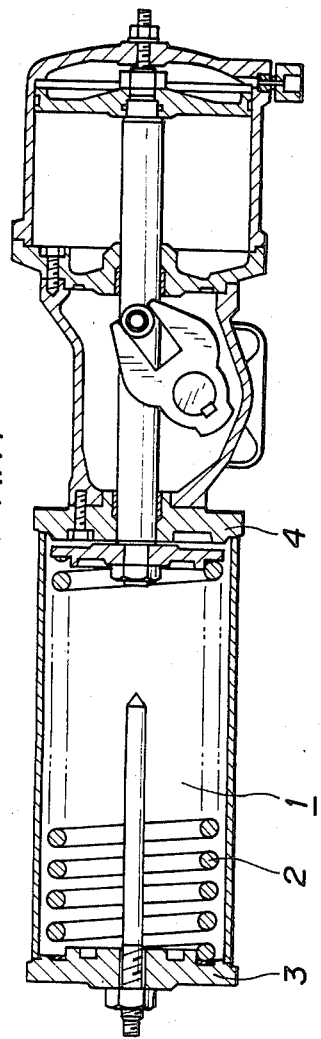
FIG. 1 is a lateral cross section illustrating a prior art spring-return type actuator.
Figure 2:
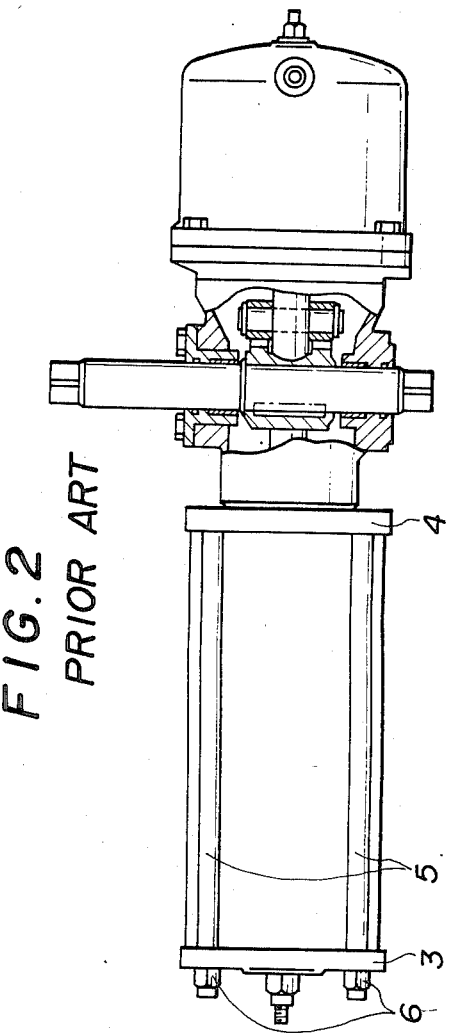
FIG. 2 is a partially sectioned front view of the prior art actuator.
Figure 3:
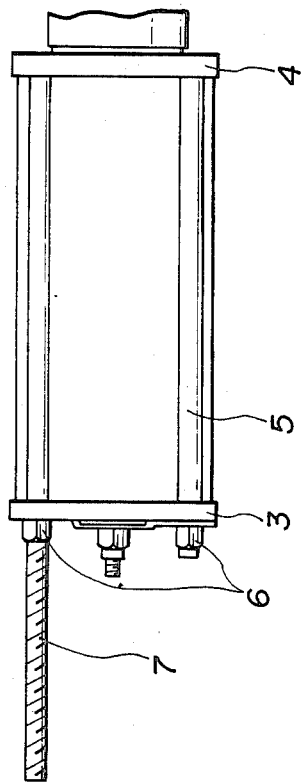
FIG. 3 is a front view showing a part of the prior art actuator and illustrating how to disassemble the part.
Figure 4:
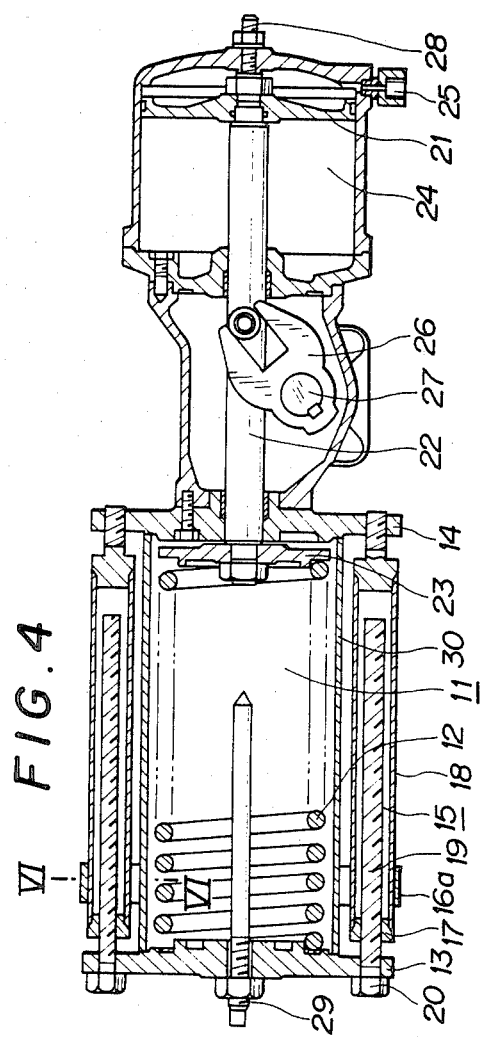
FIG. 4 is a lateral cross section illustrating one embodiment of the spring-return type actuator according to the present invention.

FIG. 4 is a lateral cross section illustrating one embodiment of a spring-return type actuator according to the present invention. The actuator of this embodiment is adapted to be used for actuating a valve (not shown) which is opened or closed by its part-turn motion, and comprises a cylinder 24 having a port 25 serving as inlet and outlet for a pressurized fluid, a piston 21 slidably positioned in the cylinder for reciprocating with respect to the cylinder, a piston rod 22 attached to the piston 21 and slidably positioned within the actuator, a valve drive shaft 27 rotatably positioned within the actuator, a scotch yoke type movement conversion-transmission means 26 operatively associated with both the piston rod 22 and the valve drive shaft 27 for converting the reciprocation of the piston rod 22 into a rotary motion of the valve drive shaft 27, a spring means 11 having a spring box 30 which accommodates therein a coil spring 12 compressed between one of the opposite side walls 13 of the spring means 11 and a spring holder 23 attached to the piston rod 22 and accommodated within the spring box 30, stoppers 28 and 29 attached respectively to the wall of the cylinder 24 and the one side wall 13 of the spring means 11 for defining the reciprocation of the piston rod 22, and a plurality of tie rods 15 each comprising a male member 20 having one end thereof attached to the flange portion of the one side wall 13 of the spring means 11 and having an external thread portion 19, and a female member 18 having one end thereof screwed into the flange portion of the other side wall 14 of the spring means 11 and having an internal thread portion 17 helically meshed with the external thread portion 19 of the male member 20.

The coil spring 12 has its one end bearing against the one side wall 13 of the spring means 11 and its other end bearing against the spring holder 23 to bias the piston rod 22 rightward in FIG. 4, and is set in a compressed state such that it has a large resilient force even when it has been extended to the fullest extent within the spring means 11 to move the piston 21 to its rightmost position as shown in FIG. 4.

The reciprocation of the piston 21 between the stoppers 28 and 29 can be attained by fluid pressure and spring force. More specifically, the piston 21 is moved leftward in FIG. 4 against the biasing force of the spring 12 by introducing compressed air or oil into the cylinder 24 via the port 25 and is returned rightward in FIG. 4 by the resilient force of the spring 12 when the fluid pressure within the cylinder has been relieved through the port 25. The reciprocation of the piston 21 is transmitted to the drive shaft 27 in the form of a rotary motion by the movement conversion-transmission means 26, thereby opening or closing a valve.

The female member 18 of each of the tie rods 15 in this embodiment has its one end screwed into the flange portion of to the other side wall 14 of the spring means 11, has its other end provided with the internal thread portion 17, and has a winglike member 16a attached to the outer periphery of the female member 18 at a position in the vicinity of the leading end of the female member 18, the winglike member 16a being provided with a pair of wing arms for engaging the female member 18 with the outer periphery of the spring box 30. On the other hand, the male member 20 comprises a head and the external thread portion 19 extending vertically from the lower surface of the head. The external thread portion 19 is inserted into a hole bored in the flange portion of the one side wall 13 of the spring means 11 and, by rotating the head, helically meshed with the internal thread portion 17 and is gradually driven into the female member 18 until the lower surface of the head comes into contact with the outer surface of the flange portion of the side wall 13 of the spring means 11. As a result, the side walls 13 and 14 are connected by the tie rods 15. The length of the tie rods 15, in the state wherein the leading end of the external thread portion 19 of the male member 20 is helically meshed with the internal thread portion 17 of the female member 18, is set larger than the free length of the spring 12.

With the construction of this embodiment as described above, when the male members 20 of the tie rods 15 are turned and loosened from the state shown in FIG. 4 for the purpose of disassembling the spring means 11, they are gradually projected in the leftward direction and the side wall 13 of the spring means 11 is concurrently moved in the same direction by means of the resilient force of the spring 12 kept in the compressed state. The male members 20 are further turned until the leading ends thereof are helically meshed with the internal thread portions 17 of the female members 18 and, as a result, the spring 12 extends to its free length. Then, the male members 20 are unscrewed from the female members 18. Therefore, there is no fear of the side wall 13 of the spring means 11 springing out or the spring 12 in the compressed state bursting out of the spring means 11.

The female member 18 of each of the tie rods 15 has its one end screwed into the side wall 14 of the spring means 11 and has a winglike member 16a attached to the outer periphery of the female member for engaging the female member 18 with the outer periphery of the spring box 30 as described above. If the ends of the female members 18 are merely screwed into the side wall 14, when the male members 20 are turned and loosened, the female members 18 are simultaneously turned and disengaged from the side wall 14 and consequently the side wall 13 of the spring means 11 and the tie rods 15 spring out by the resilient force of the spring 12 to entail a possibility of injuring the workers or damaging the surrounding articles. Therefore, it is required that the female members 18 not be rotated when the male members 20 are driven. To avoid the rotation of the female members 18, the female members 18 may be fixed to the side wall 14 of the spring means 11 by welding (not shown). In this case, however, the welding must be done in a state wherein the female members 18 have been set in position relative to the side wall 14 of the spring means 11. This work is very troublesome. This is why this embodiment provides the winglike members 16a.

FIG. 8 illustrates a second embodiment of the spring-return type actuator according to the present invention. The same elements as those in the first embodiment are indicated by the same reference numerals as used in FIG. 4, and description thereof is omitted in the following.

In the second embodiment shown in FIG. 8, a cylinder 24 having a port 25 serving as inlet and outlet for a pressurized fluid is disposed on the left side of a spring means 11 and has a piston 21 accommodated within the spring means so as to serve also as the spring holder 23 used in the first embodiment. A spring 12 is accommodated within the spring means 11 in a compressed state and interposed between one side wall 13 of the spring means 11 and the piston 21. The piston 21 is moved rightward in FIG. 8 against the biasing force of the spring 12 by introducing compressed air or oil into the cylinder 24 via the port 25 and is returned leftward in FIG. 8 by the resilient force of the spring 12 when the fluid pressure within the cylinder has been relieved through the port 25.

The remaining construction of this embodiment is the same as that of the first embodiment. In disassembling the spring means 11, therefore, there is no fear of the side wall 13 of the spring means 11 springing out or the spring 12 in the compressed state bursting out of the spring means 11, similarly to the first embodiment.

The winglike member 16a is fixed by welding to the female member 18 at a position in the vicinity of the leading end thereof. The spring means 11 is mounted on the main body of the actuator by attaching the side wall 14 to the main body, fixing the spring holder 23 to the piston rod, screwing the female members 18, which are each provided with one of the winglike members 16a, into the side wall 14, inserting a spring box 30 and the spring 12 into a space defined by the female members 18, and turning the male members 20 passed through the holes in the side wall 13 with the external thread portions 19 meshed helically with the internal thread portions 17 of the female members 18 until the heads of the male members 20 are brought into contact with the side wall 13. As a result, the winglike members 16a engage with the spring box 30. The relationship between the female member 18, external thread portion 19 of the male member 20, winglike member 16a and spring box 30 is best shown in FIG. 6 which is a cross section taken along line VI—VI in FIG. 4. The winglike member 16a may be of a shape as shown in FIG. 7(A) or FIG. 7(B) insofar as it can be fixed to the female member 18 and can engage with the spring box 30 to thereby prevent the female member 18 from being rotated in conjunction with the rotation of the male member 20. The position at which the winglike member 16a is fixed to the female member 18 should be in the vicinity of the leading end of the female member 18, i.e. in the vicinity of the internal thread portion 17, because it is necessary to secure the state of engagement between the winglike member 16a and the spring box 30 until the helical engagement between the external thread portion 19 and the internal thread portion 17 is released.

FIG. 5 is a front view showing a part of the first embodiment, from which it will be noted that there are four tie rods 15, two on the front side as shown and two on the rear side (not shown). Therefore, when the part shown in FIG. 5 is laterally sectioned at the center, the tie rods 15 do not appear on the centrally laterally sectioned view. That is to say, the tie rods 15 appearing in FIGS. 4 and 8 have been illustrated for reasons of convenience. In addition, the number of the rods 15 should not be limited to four in view of the construction thereof. It may be at least two.

With the construction of the first embodiment as described above, when the male members 20 of the tie rods 15 are turned and loosened from the state of FIG. 4 for the purpose of disassembling the spring means 11, they are gradually projected in the leftward direction with the female members 18 prevented from rotation by the engagement of the winglike members 16a with the spring box 30, and the side wall 13 of the spring means 11 is concurrently moved in the same direction by means of the resilient force of the spring 12 kept in the compressed state. In proportion to the movement of the side wall 13 in the leftward direction, the spring 12 gradually extends to reduce its resilient force gradually. At the time the helical engagement between the external and internal thread portions 19 and 17 is released, the spring 12 has already extended to its free length. Therefore, there is no fear of the side wall 13 of the spring means 11 springing out or the spring 12 in the compressed state bursting out of the spring means 11 during the disassembly operation of the spring means.

The port 25 in any of the embodiments described above is used as inlet and outlet for a pressurized fluid. However, it may be used exclusively as an inlet and an outlet port (not shown) may be separately formed in the wall of the cylinder 24. Furthr, in the embodiments, the scotch yoke type movement conversion-transmission means 26 is used. However, this means may be of a combination rack and pinion type or a link type insofar as it can serve to convert the reciprocation of the piston rod 22 into a rotary motion of the valve drive shaft 27.

According to the present invention, as described above, since each of the tie rods which connect the opposite side walls of the spring means comprises the male member and the female member with the external and internal thread portions thereof meshed helically with each other so that the helical engagement which is released by gradual rotation of the male member is guaranteed until the spring extends to its free length, there is no fear of the side wall springing out or the spring bursting out of the spring means to injure the workers or damage the surrounding articles in disassembling the spring means. Therefore, it is possible to completely avoid the conventional problems of accidents due to lack of knowledge of disassembling the spring means, or due to unintentional damage or looseness caused by vibration etc. Further, the disassembling or assembling operation is easy to conduct without requiring any special disassembling/assembling means.

Although the present invention has been described and illustrated with reference to the foregoing embodiments, it is to be understood that various modifications and changes may be made to the specifically described and illustrated features without departing from the scope of the present invention.

What is claimed is:

1. A spring-return type actuator comprising:
   a cylinder having at least one port serving as inlet and outlet for a pressurized fluid;
   a piston slidably positioned in said cylinder for reciprocating with respect to said cylinder;

a piston rod attached to said piston and slidably positioned within the actuator;

a drive shaft rotatably positioned within the actuator;

a movement conversion-transmission means operatively associated with both said piston rod and said drive shaft for converting the reciprocation of said piston rod into a rotary motion of said drive shaft;

a spring means comprising a spring box, a pair of opposite side walls each having a flange portion projecting outwardly from the periphery of said spring box, a spring holder attached to said piston rod and accommodated within said spring box, and a spring accommodated within said spring box and compressed between one side wall of said pair of opposite side walls and said spring holder;

a pair of stoppers attached respectively to a wall of said cylinder and to said one side wall of said spring means for defining the reciprocation of said piston rod;

a plurality of tie rods each comprising a male member having one end thereof attached to the flange portion of said one side wall of said spring means and having an external thread portion, and a female member having one end thereof screwed into the flange portion of the other side wall of said spring means and having an internal thread portion helically meshed with said external thread portion of said male member, each of said plurality of tie rods having a length which is larger than the free length of said spring when measured immediately before the leading end of said external thread portion of said male member is released from engagement with said internal thread portion of said female member, thereby preventing said one side wall of said spring means from springing out of and said spring from bursting out of said spring box; and a plurality of winglike members each fixedly attached to the outer periphery of said female member at a position in the vicinity of the leading end of said female member, each winglike member being provided with a pair of wing arms for engaging said female member with the outer periphery of said spring box to prevent said female member from being rotated in conjunction with rotation of said male member when said male member is being threaded into or out of said female member.

* * * * *